United States Patent Office 3,627,501
Patented Dec. 14, 1971

3,627,501
PROCESS FOR THE DISPROPORTIONATION OF CHLOROSILANES AND ORGANOSILANES
Manfred Kruger, Offenbach, Germany, assignor to Deutsche Gold- und Silber-Scheideanstalt vormals Roessler, Frankfurt (Main), Germany
No Drawing. Filed June 24, 1969, Ser. No. 836,175
Claims priority, application Germany, June 29, 1968, P 17 67 905.9
Int. Cl. C07f 7/12, 7/18
U.S. Cl. 23—366
16 Claims

ABSTRACT OF THE DISCLOSURE

Chlorosilanes and organosilanes having at least one Si—H bond are disproportionated to hydrogen rich and hydrogen poor products by use of an activated carbon catalyst. The disproportionation is also obtained with good success using alkali metal halides admixed with transition metal halides or cyanides as catalysts.

---

The invention is directed to a process of disproportionation of halosilanes or organosilanes having at least one Si—H bond into hydrogen rich and hydrogen poor compounds.

Chlorosilanes are used in industry for various purposes. Besides the chlorosilanes, trichlorosilane and silicon tetrachloride which are useful for the preparation of silicon or for the production of finely divided silicon dioxide, dichlorosilane is also of especial interest in the technics since it is used for the synthesis of organosilicon compounds and can serve as catalyst in the polymerization of olefins.

It is known to produce halosilanes having one or more Si—H bonds particularly dichlorosilane, by hydrochlorination silicon or ferrosilicon at a temperature of about 300° C. if necessary in the presence of copper or cuprous chloride as a catalyst. Trichlorosilane is obtained thereby in preponderant amount, the yield of dichlorosilane is very small.

Also the known reduction of silicon tetrachloride for example with LiAlH$_4$ is not suited for the selective production of dichlorosilane since the reduction proceeds preferentially through the step of further reaction of the dichlorosilane to the monosilane.

Furthermore, there is also described the chlorination of monosilane. This must be carried out at low temperatures because of its explosive tendency; a selective production of dichlorosilane is not successful by this process.

Besides these types of production of halosilanes with the Si—H bond there are also known a series of conproportionation and disproportionation processes for the production of these products.

Thus German Pat. 967,463 describes the use of an elevated pressure and elevated temperature in a conproportionation between monosilane and silicon tetrachloride in the presence of aluminum chloride.

Furthermore there is described in U.S. Pat. 2,627,451 a disproportionation of trichlorosilane taking place in the presence of metal halides of the acid type, e.g. aluminum chloride at 300–450° C. under elevated pressure according to the equation $$2HSiCl_3 \rightarrow H_2SiCl_2 + SiCl_4$$

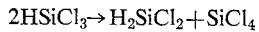

This reaction can also be carried out in the presence of secondary or tertiary amines or nitriles as catalysts at elevated temperatures under pressure with reaction times up to 2 hours (German Pat. 956,405) or with the use of dimethyl formamide or triphenyl phosphine as catalysts at elevated temperatures and pressure with reaction times of around 15 hours (U.S. Pat. 3,322,511).

Finally there is described in U.S. Pat. 2,732,280 a process for carrying out the above-named disproportionation in the presence of dialkylcyanamides as catalyst with 5 to 10 hour refluxing of trichlorosilane at normal pressure and continuous distillation of the dichlorosilane formed.

The known con- and disproportionation processes have many disadvantages since high pressures must be used and the reaction takes so long that a continuous method of operation is scarcely possible. In some of the disproportionation processes the reaction products obtained are not free of catalysts which can cause further uncontrollable reaction of the products and always require an additional fine purification.

The invention is directed to the problem of developing a process by which a halosilane or organosilane containing at least one Si—H bond can be continuously or discontinuously disproportionated to definite hydrogen rich and hydrogen poor compounds while avoiding elevated working pressures and without the risk of forming undesired reaction products.

This problem was solved according to the invention by carrying out the disproportionation with the use of activated carbon as catalyst. When carrying out the process discontinuously the activated carbon is used in an amount of 5 to 50% based on the weight of the compound being disproportionated. When carrying out the process continuously, sufficient amounts of activated carbon as catalyst are used for achieving the maximum yield of disproportionation product. These amounts are smaller in comparison with the amounts used in the discontinuous process variant.

The disproportionation can also be carried out with good success by using as the catalyst a mixture of an alkali metal halide and a finely divided transition metal halide or cyanide. As alkali metal halide there can be employed sodium chloride and potassium chloride. As the transition metal compound there can be used silver chloride, silver cyanide, cuprous chloride and cuprous cyanide. The alkali metal halide is used in an amount of 2 to 20 parts per part of transition metal halide or cyanide.

According to the invention therefore chlorosilane, organic substituted chlorosilane or organosilane with at least one Si—H bond of the general formula $$H_nSiCl_pR_{4-(n+p)}$$

where R signifies an organic group, $n$ is 1 to 3, $p$ is 0 to 3 and $n+p$ is 1 to 4 can be subjected to a ligand disproportionation reaction in the presence of the named catalysts (activated carbon or mixture of alkali metal and transition metal compounds) which are characterized by a very large specific surface area, generally up to 2000 square meters per gram for activated carbon and by a particle size of about 40 μm. or less for the mixture of alkali metal compound and transition metal compound, using a short reaction time. The reaction time is usually not over 5 minutes, preferably being from 1 to 60 seconds.

As compounds which can be disproportionated there can be used dichlorosilane, trichlorosilane, dimethoxysilane, trimethoxysilane, diethoxysilane, triethoxysilane, dipropoxysilane, tripropoxysilane, dibutoxpsilane, tributoxysilane, monomethoxy monochorosilane, monomethoxy dichlorosilane, dimethoxy monochlorosilane.

Illustrative disproportionation reactions include, for example, in the case where $n+p$ is 4.

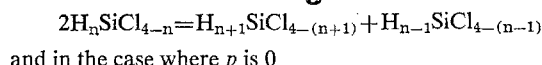

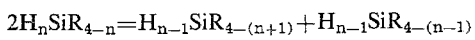

The reaction is preferably carried out at normal (atmospheric) pressure or at pressures slightly above e.g. a pressure of 1500 torr and at temperatures of from 20–500° C. One of the advantages of the present process is that it is not necessary to use super atmospheric pressure.

According to a preferred variation of the process trichlorosilane is disproportionated to dichlorosilane and silicon tetrachloride or trimethoxysilane is disproportionated to dimethoxysilane and tetramethoxysilane.

The process can be carried out continuously and the unreacted product be recycled. For the disproportionation of trichlorosilane it is significant that the trichlorosilane with or without carrier gas is vaporized and led through a hot tube loaded with the catalyst. The easily volatile dichlorosilane is continuously separated from the $HSiCl_3/SiCl_4$ mixture in a column connected to the tube. The silicon tetrachloride is continuously separated in a further column. The remaining trichlorosilane is returned to the reaction tube for further decomposition.

Unless otherwise indicated, all parts and percentages are by weight.

The invention will be further illustrated by the following examples.

EXAMPLE 1

25 ml. of pure, liquid trichlorosilane were introduced into a closeable 100 ml. Erlenmeyer flask containing 6 grams of dried, oxygen free granular activated carbon (specific surface area 1250 m.$^2$/g.) under a nitrogen atmosphere with cooling. After being allowed to stand at room temperature, the supernatant liquid contained besides $HSiCl_3$ (by gas chromatography) after 5 minutes 0.07 mol percent $H_2SiCl_2$ and 0.4 mol percent $SiCl_4$, after 30 minutes 0.3 mol percent $H_2SiCl_2$ and 1.3 mol percent $SiCl_4$, after 4 hours 50 minutes 3.2 mol percent $H_2SiCl_2$ and 5.8 mol percent $SiCl_4$, after 43 hours 4.5 mol percent $H_2SiCl_2$ and 7.7 mol percent $SiCl_4$.

EXAMPLE 2

A stream of dried nitrogen (about 3 liters/hour) containing 35 volume percent $HSiCl_3$ was led through a bed of 20 grams of dried, oxygen free granular activated carbon (specific surface area 1250 m.$^2$/g.) heated to 150 to 250° C. The bed was in a quartz glass tube 20 cm. long and 1.6 cm. diameter. First, this treatment served for 2–3 hours the adsorption of the $HSiCl_3$ by the activated carbon, the activation and the establishing of a stationary equilibrium. In running operation, there was established then in the gas mixture, after a residence time of about 15 seconds in the reaction oven, besides $HSiCl_3$ about 5 mol percent $H_2SiCl_2$ and about 15 mol percent $SiCl_4$ based on the total of the chlorosilanes.

EXAMPLE 3

In an otherwise same method of operation as in Example 2 there was used as filling for the quartz glass tube 25 grams of a mixture of 1 part by weight of AgCl and 10 parts by weight of NaCl which had been finely ground to a particle size of 40 μm. or less, pressed and redivided to pea size. The reaction bed was heated to 345–360° C. The reaction mixture contained, based on the chlorosilanes, besides $HSiCl_3$ about 7 mol percent $H_2SiCl_2$ and about 13 mole percent $SiCl_4$.

EXAMPLE 4

Example 2 was repeated using as the filling for the quartz glass tube 25 grams of a mixture of 1 part CuCl and 10 parts NaCl which had been finely ground to a particle size of 40 μm. or less, pressed and redivided to pea size. The reaction bed was heated to 460° C. The reaction mixture contained, based on the chlorosilanes, besides $HSiCl_3$ about 2 mol percent $H_2SiCl_2$ and about 10 mol percent $SiCl_4$.

EXAMPLE 5

Example 2 was repeated using as the filling for the quartz glass tube 25 grams of a mixture of 1 part CuCN and 10 parts NaCl which had been finely ground to a particle size of 40 μm. or less, pressed and redivided to pea size. The reaction bed was heated to 490–500° C. The reaction mixture contained based on the chlorosilanes besides $HSiCl_3$ about 1.5 mol percent $H_2SiCl_2$ and about 7 mole percent $SiCl_4$.

EXAMPLE 6

Example 2 was repeated using as the filling for the quartz glass tube 25 grams of NaCl finely ground to a particle size of 40 μm. or less, pressed and redivided to pea size. When the reaction bed was heated to 500–510° C., no chlorosilane other than $HSiCl_3$ was produced. At 590–615° C. the reaction mixture contained 0.4 mol percent $H_2SiCl_2$ and about 1 mol percent $SiCl_4$.

EXAMPLE 7

Example 2 was repeated filling the quartz glass tube with glass wool and heating to 515–525° C. The reaction mixture contained 0.03 mol percent $H_2SiCl_2$ and about 0.3 mol percent $SiCl_4$.

EXAMPLE 8

A stream of dried nitrogen (about 3 liters/hour) was saturated with trimethoxysilane at 50° C. and led through a bed of 20 grams of dried, oxygen free granular activated carbon (specific surface area 1250 m.$^2$/g.) in a quartz glass tube 20 cm. long and 1.6 cm. diameter at 150–250° C. First, this treatment served for 5–6 hours for adsorption of $SiH(OCH_3)_3$ by the activated carbon, and for activation and establishment of a stationary equilibrium. In running operation, with a residence time of 15 seconds in the reaction oven, there was found in the gas mixture (by gas chromatography) besides trimethoxysilane also considerable amounts (about 5 to 10%) of dimethoxysilane and tetramethoxysilane.

What is claimed is:

1. A process for the disproportionation of a member of the group consisting of halosilanes and organosilanes containing at least one Si—H bond comprising carrying out the disproportionation with the aid of a catalyst selected from the group consisting of (1) activated carbons and (2) a mixture of an alkali metal halide of the group consisting of sodium chloride and potassium chloride with a member of the group consisting of silver chloride, silver cyanide, cuprous chloride and cuprous cyanide.

2. A process according to claim 1 wherein the catalyst is activated carbon.

3. A process according to claim 2 wherein the reaction is carried out at normal (atmospheric) pressure.

4. A process according to claim 2 wherein the reaction is carried out in a contact time of not over 5 minutes.

5. A process according to claim 4 wherein the contact time is 1 to 60 seconds.

6. A process according to claim 4 wherein the temperature is 20 to 500° C.

7. A process according to claim 6 wherein the compound containing the Si—H bond is trichlorosilane and it is converted to dichlorosilane and silicon tetrachloride.

8. A process according to claim 6 wherein the compound containing the Si—H bond is trimethoxysilane and it is converted to dimethosysilane and tetramethoxysilane.

9. A process according to claim 16 wherein the catalyst is a mixture of said alkali metal halide and a member of the group consisting of silver chloride, cuprous chloride and cuprous cyanide.

10. A process according to claim 9 wherein the reaction is carried out at normal (atmospheric) pressure.

11. A process according to claim 9 wherein the reaction is carried out in a contact time of not over 5 minutes.

12. A process according to claim 11 wherein the contact time is 1 to 60 seconds.

13. A process according to claim 11 wherein the temperature is 20 to 500° C.

14. A process according to claim 11 wherein the compound containing the Si—H bond is trichlorosilane and it is converted to dichlorosilane and tetrachlorosilane.

15. A process according to claim 11 wherein the compound the Si—H bond is trimethoxysilane and it is converted to dimethoxysilane and tetramethoxysilane.

16. A process according to claim 1 wherein the catalyst is a mixture of sodium chloride and a member of the group consisting of silver chloride, cuprous chloride and cuprous cyanide.

References Cited

UNITED STATES PATENTS

| | | | |
|---|---|---|---|
| 2,732,282 | 1/1956 | Bailey et al. | 260—448.2 P X |
| 2,888,478 | 5/1959 | Ashby | 260—448.2 P |
| 3,445,200 | 5/1969 | Donogues et al. | 260—448.2 P X |

TOBIAS E. LEVOW, Primary Examiner

P. F. SHAVER, Assistant Examiner

U.S. Cl. X.R.

260—448.2 P, 448.8 R